(12) United States Patent
Emura

(10) Patent No.: US 9,934,649 B2
(45) Date of Patent: Apr. 3, 2018

(54) INFORMATION PROCESSING DEVICE, INFORMATION PROCESSING METHOD, AND INFORMATION PROCESSING PROGRAM

(71) Applicant: Rakuten, Inc., Tokyo (JP)

(72) Inventor: Sadaaki Emura, Setagaya-ku (JP)

(73) Assignee: Rakuten, Inc., Tokyo (JP)

( * ) Notice: Subject to any disclaimer, the term of this patent is extended or adjusted under 35 U.S.C. 154(b) by 33 days.

(21) Appl. No.: 14/917,187

(22) PCT Filed: Jun. 25, 2014

(86) PCT No.: PCT/JP2014/066839
§ 371 (c)(1),
(2) Date: Mar. 7, 2016

(87) PCT Pub. No.: WO2015/037305
PCT Pub. Date: Mar. 19, 2015

(65) Prior Publication Data
US 2016/0217651 A1 Jul. 28, 2016

(30) Foreign Application Priority Data

Sep. 13, 2013 (JP) ................ 2013-191073

(51) Int. Cl.
*A63F 9/24* (2006.01)
*A63F 13/00* (2014.01)
(Continued)

(52) U.S. Cl.
CPC ......... *G07F 17/3225* (2013.01); *G06Q 10/10* (2013.01); *G06Q 50/34* (2013.01); *G07F 17/3244* (2013.01); *G07F 17/3288* (2013.01)

(58) Field of Classification Search
CPC .. A63F 3/00157; A63F 2300/69; G06Q 50/34
See application file for complete search history.

(56) References Cited

U.S. PATENT DOCUMENTS 5,774,118 A * 6/1998 Hatakama ............. G06F 9/4446
715/707
5,963,910 A * 10/1999 Ulwick .................. G06Q 10/06
705/7.28

(Continued)

FOREIGN PATENT DOCUMENTS

| JP | 2007-87328 A | 4/2007 |
|---|---|---|
| JP | 2012-14407 A | 1/2012 |
| JP | 2013-37584 A | 2/2013 |

OTHER PUBLICATIONS

Kosuke Nonaka, Otegaru Keiba Apuri 'Daimajin' wa Sugokatta!! Ninkiusu no Anauma mo Hirotte 3 Rentan Tekichu no Jitsuryoku o Hakki, [online], nifty, Mar. 15, 2013, Internet <URL:http://keiba.nifty.com/cs/column-detail/ pdetail/daimajin20130315/1.htm>.

(Continued)

*Primary Examiner* — Kevin Y Kim
(74) *Attorney, Agent, or Firm* — Sughrue Mion, PLLC

(57) ABSTRACT

It is an object to automatically provide information suitable for a user without increasing time or effort of the user. An information processing device acquires an operation history of a predetermined user about one or more races from storage device. The information processing device determines a skill level of the predetermined user about purchasing of betting tickets according to the operation status identified by the operation history. The information processing device controls display of the race information in response to a request from the predetermined user according to the skill level.

13 Claims, 13 Drawing Sheets

(51) Int. Cl.
  *G06F 17/00*    (2006.01)
  *G06F 19/00*    (2018.01)
  *G07F 17/32*    (2006.01)
  *G06Q 50/34*    (2012.01)
  *G06Q 10/10*    (2012.01)

(56) References Cited

U.S. PATENT DOCUMENTS

| | | | | |
|---|---|---|---|---|
| 2001/0037211 | A1* | 11/2001 | McNutt | G06Q 20/3674 |
| | | | | 463/29 |
| 2001/0056384 | A1* | 12/2001 | Matsumura | G06F 17/3089 |
| | | | | 705/26.1 |
| 2003/0109310 | A1* | 6/2003 | Heaton | A63F 3/00157 |
| | | | | 463/42 |
| 2005/0003878 | A1* | 1/2005 | Updike | G07F 17/3288 |
| | | | | 463/16 |
| 2007/0106553 | A1* | 5/2007 | Jordan | G06Q 30/0209 |
| | | | | 705/14.12 |

OTHER PUBLICATIONS

International Search Report for PCT/JP2014/066839 dated Aug. 12, 2014 [PCT/ISA/210].

\* cited by examiner

FIG.2

| RACECARD | | | | | | | | |
|---|---|---|---|---|---|---|---|---|
| × × RACECOURSE 11R | | | | | | | | |
| BRACKET NUMBER | HORSE NUMBER | SIRE NAME OF HORSE DAM ODDS DATE OF BIRTH OWNER BREEDER | AGE COAT COLOR WEIGHT JOCKEY TRAINER | WEIGHT OF HORSE IN THE CASE OF OBJECT OF CONSECUTIVE WIN | INCREASE/ DECREASE OF WEIGHT OF HORSE | LAST 5 RACES | | RECORDS |
| | | | | | | LAST RACE | ... | ALL RECORDS CURRENT RACECOURSE 1700m CURRENT COURSE | ~1400 1401~1600 1601~1800 1801~ |
| 1 | 1 | SIRE 1 RACEHORSE 1 DAM 1 44.3 BORN IN 2009/1/1 XXXX BRED BY XXXX | FILLY 4 CHESTNUT 56.0 XXXX XXXX | 452 — 487 | — — | 6 HARD 8 XXX 13.07.01 XXXX A4 1400 RIGHT-HANDED TURF 5 XXXX 56.0 1:45.3 (1.9) 39.7 478k 7 9-9-9-8 RACEHORSE A1 | ... | 1 2 4 21 1 2 4 19 0 0 3 11 0 0 3 10 | 1 2 1 9 0 0 0 0 0 0 3 11 0 0 0 1 |
| | | | | | | | | OWN RECORDS | |
| | | | | | | | | 1200 1700 1800 X1700 | X1120 HARD TURF 12 X1475 HARD TURF 11 — X1502 HARD TURF 3 |

FIG.3A

| ODDS | | | | |
|---|---|---|---|---|
| XX RACECOURSE 11R | | | | MANUAL UPDATE |
| BRACKET NUMBER | HORSE NUMBER | NAME OF HORSE | WIN ODDS | PLACE ODDS |
| 1 | 1 | RACEHORSE 1 | 44.3 | 4.1-9.5 |
| 2 | 2 | RACEHORSE 2 | 2.8 | 1.4-2.2 |
| 3 | 3 | RACEHORSE 3 | 11.1 | 7.7-18.5 |
| 4 | 4 | RACEHORSE 4 | 22.2 | 2.0-4.0 |
| 5 | 5 | RACEHORSE 5 | 14.8 | 2.9-6.4 |
| 5 | 6 | RACEHORSE 6 | 2.3 | 1.3-2.1 |
| 6 | 7 | RACEHORSE 7 | 5.6 | 1.7-3.4 |
| 6 | 8 | RACEHORSE 8 | 14.8 | 7.7-18.5 |
| 7 | 9 | RACEHORSE 9 | 7.4 | 2.3-4.9 |
| 7 | 10 | RACEHORSE 10 | 11.1 | 1.1-2.0 |
| 8 | 11 | RACEHORSE 11 | 44.3 | 1.7-3.4 |
| 8 | 12 | RACEHORSE 12 | 13.2 | 7.7-18.5 |

FIG.3B

| LIST OF FORECAST | | | | | | | | |
|---|---|---|---|---|---|---|---|---|
| LIST FOR XX RACECOURSE 11R | | | | | | | | |
| RACE | ◎ | ○ | ▲ | △ | FORECASTER | FORECAST HIT RATE | FORECAST RESPONSE RATE | DETAILS |
| 11R | 9 | 4 | 1 | 10 | MR. A | 71.4% | 26.7% | DETAILS |
| 11R | 4 | 9 | 1 | 10 | MR. B | 72.7% | 55.4% | DETAILS |
| 11R | 12 | 10 | 7 | 6 | MR. C | 68.2% | 87.1% | DETAILS |
| 11R | 5 | 4 | 10 | 9 | MR. D | 63.6% | 100.1% | DETAILS |
| 11R | 4 | 1 | 11 | 9 | MR. E | 60.2% | 72.7% | DETAILS |
| 11R | 4 | 9 | 11 | 12 | MR. F | 59.3% | 75.0% | DETAILS |
| 11R | 4 | 9 | 11 | 3 | MR. G | 58.0% | 68.4% | DETAILS |
| 11R | 4 | 3 | 12 | 10 | MR. H | 56.5% | 63.7% | DETAILS |
| 11R | 11 | 4 | 1 | 3 | MR. I | 55.9% | 68.4% | DETAILS |
| 11R | 4 | 3 | 6 | 9 | MR. J | 56.8% | 108.6% | DETAILS |

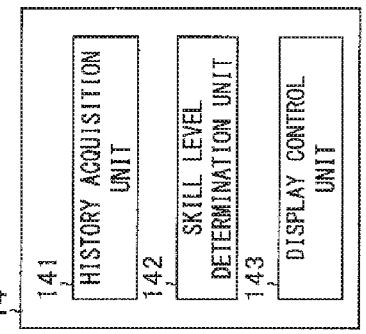
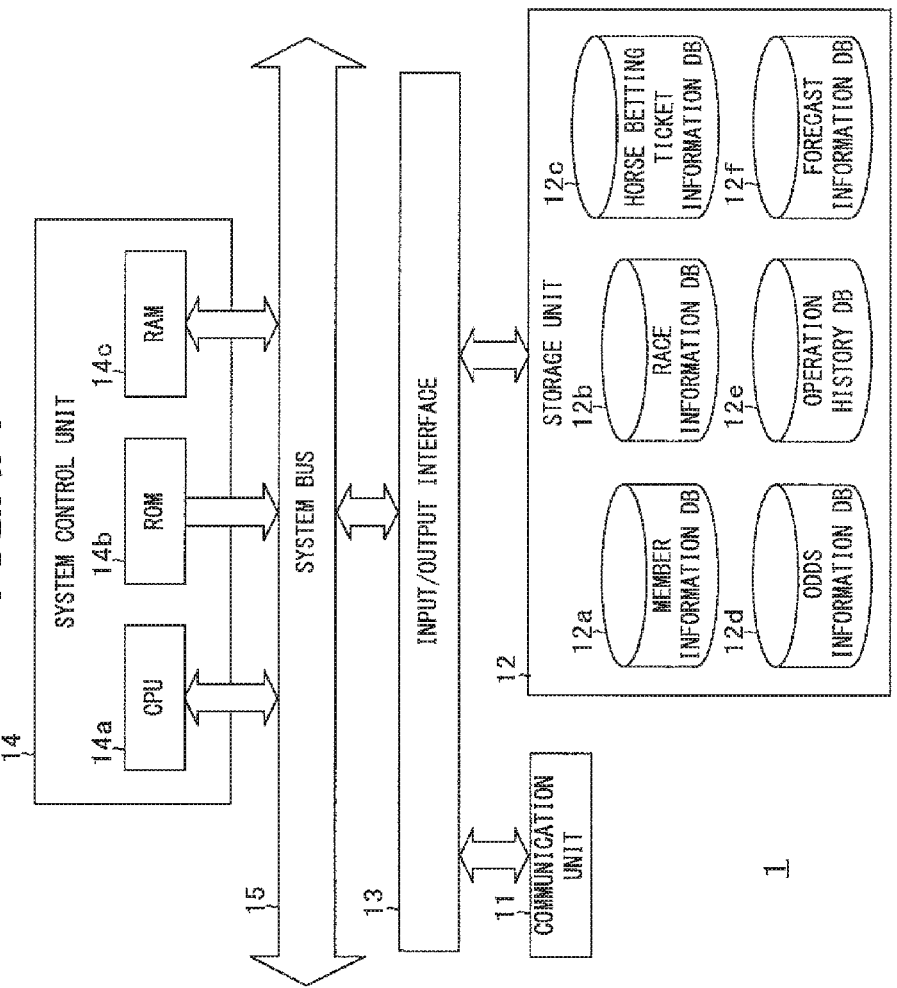

FIG.5A
MEMBER INFORMATION DB — 12a

| USER ID |
| --- |
| PASSWORD |
| NICKNAME |
| NAME |
| DATE OF BIRTH |
| SEX |
| ZIP CODE |
| ADDRESS |
| TELEPHONE NUMBER |
| E-MAIL ADDRESS |
| . . . |

FIG.5B
RACE INFORMATION DB — 12b

| RACE ID |
| --- |
| NAME OF RACE |
| GRADE |
| NAME OF RACECOURSE |
| DATE OF RACE |
| POST TIME |
| RACE NUMBER |
| HORSE ENTRY INFORMATION |
| . . . |

FIG.5C
HORSE BETTING TICKET INFORMATION DB — 12c

| RACE ID |
| --- |
| HORSE BETTING TICKET ID |
| TYPE OF BET |
| HORSE NUMBER/BRACKET NUMBER |
| . . . |

FIG.5D
ODDS INFORMATION DB — 12d

| RACE ID |
| --- |
| HORSE BETTING TICKET ID |
| DATE OF UPDATE |
| ODDS |
| . . . |

FIG.5E
OPERATION HISTORY DB — 12e

| USER ID |
| --- |
| DATE OF OPERATION |
| DETAILED INFORMATION |

FIG.5F
DETAILED INFORMATION

| OPERATION TYPE = VIEW |
| --- |
| RACE ID |
| PAGE TYPE |
| . . . |

FIG.5G
DETAILED INFORMATION

| OPERATION TYPE = MANUAL UPDATE |
| --- |
| RACE ID |
| . . . |

FIG.5H
DETAILED INFORMATION OF HISTORY

| OPERATION TYPE = PURCHASE |
| --- |
| RACE ID |
| HORSE BETTING TICKET ID |
| TYPE OF BET |
| HORSE NUMBER/BRACKET NUMBER |
| NUMBER OF PURCHASED TICKETS |
| . . . |

FIG.5I
FORECAST INFORMATION DB — 12f

| USER ID |
| --- |
| DATE OF POST |
| RACE ID |
| HORSE NUMBERS OF FAVORITE, RIVAL, DARK HORSE, LOWER LEVEL HORSES |
| . . . |

FIG.6A

| METHOD | OPERATION HISTORY | DETERMINATION POINTS | SKILL LEVEL |
|---|---|---|---|
| 1 | HISTORY OF MANUAL UPDATE OF ODDS | FREQUENCY OF MANUAL UPDATE | SKILL LEVEL IS HIGHER AS FREQUENCY OF UPDATE IS HIGHER |
| 2 | VIEWING HISTORY OF RACECARD PAGE VIEWING HISTORY OF FORECAST LIST PAGE | RATIO OF DISPLAY TIME = DISPLAY TIME OF RACECARD PAGE / DISPLAY TIME OF FORECAST PAGE | SKILL LEVEL IS HIGHER AS RATIO OF DISPLAY TIME IS HIGHER |
| 3 | VIEWING HISTORY OF RACECARD PAGE VIEWING HISTORY OF ODDS PAGE VIEWING HISTORY OF FORECAST LIST PAGE | DISPLAY TIME OF RACECARD PAGE WHEN ODDS PAGE OR FORECAST PAGE IS VIEWED AFTER RACECARD PAGE | SKILL LEVEL IS LOWER AS DISPLAY TIME IS SHORTER |
| 4 | PURCHASE HISTORY | NUMBER OF RACEHORSES OR BRACKETS THAT WERE BET | SKILL LEVEL IS HIGHER AS NUMBER OF BET OBJECTS IS LARGER |

FIG.6B

| CONTROL | PAGE | OBJECT OF CONTROL | CONTROL METHOD |
|---|---|---|---|
| 1 | ODDS PAGE | AUTOMATIC UPDATE CYCLE OF ODDS | UPDATE CYCLE IS SHORTER AS SKILL LEVEL IS HIGHER |
| 2 | ODDS PAGE | WHETHER TO EXECUTE AUTOMATIC UPDATE OF ODDS | AUTOMATIC UPDATE IS EXECUTED ONLY WHEN SKILL LEVEL IS EQUAL TO OR LARGER THAN PREDETERMINED SKILL LEVEL |
| 3 | RACECARD PAGE | AMOUNT OF INFORMATION | AMOUNT OF INFORMATION IS LARGER AS SKILL LEVEL IS HIGHER |

FIG.7

RACECARD
× × RACECOURSE : 11R

| BRACKET NUMBER | HORSE NUMBER | NAME OF HORSE<br>SIRE<br>DAM<br>ODDS<br>DATE OF BIRTH | AGE<br>COAT COLOR<br>WEIGHT<br>JOCKEY<br>TRAINER | WEIGHT OF HORSE IN THE CASE OF OBJECT OF CONSECUTIVE WIN | INCREASE/ DECREASE OF WEIGHT OF HORSE | LAST 5 RACES | | RECORDS | |
|---|---|---|---|---|---|---|---|---|---|
| | | | | | | LAST RACE | | ALL RECORDS<br>CURRENT RACECOURSE | 1700m<br>CURRENT COURSE |
| 1 | 1 | SIRE 1<br>RACEHORSE 1<br>DAM 1<br>44.3<br>BORN IN 2009/1/1 | FILLY 4<br>CHESTNUT<br>56.0<br>XXXX<br>XXXX | 452<br>—<br>467 | —<br>— | 6 HARD 8<br>XXX 13.07.01<br>XXXX<br>A4<br>1400 RIGHT-HANDED TURF 5<br>XXXX 56.0<br>1:45.3 (1.9) | ... | 1 2 4 21<br>1 2 4 19 | 0 0 3 11<br>0 0 3 10 |
| | | | | | | | | OWN RECORDS | |
| | | | | | | | | 1700<br>X1700 | X1475 HARD TURF 11<br>X1502 HARD TURF 3 |
| | | | | | | ... | ... | | |

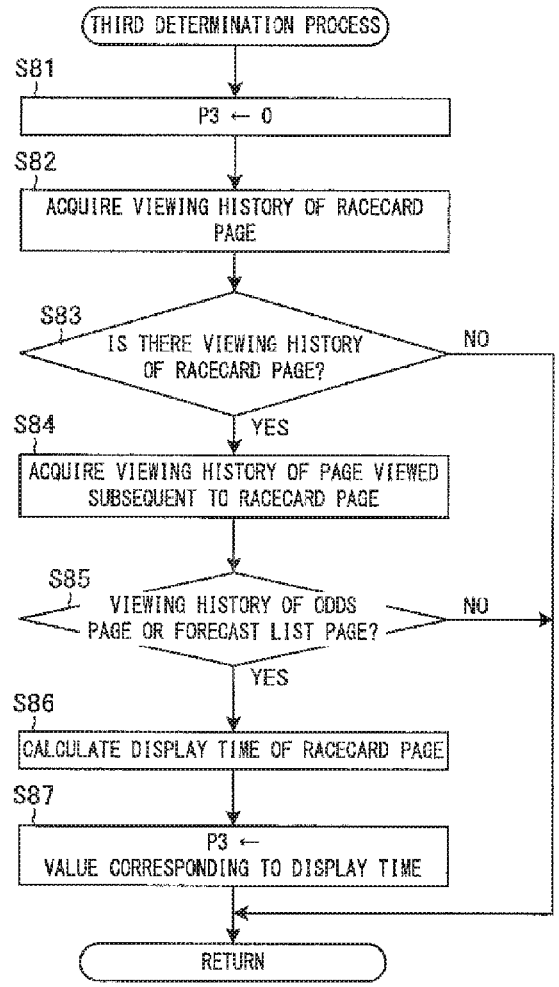
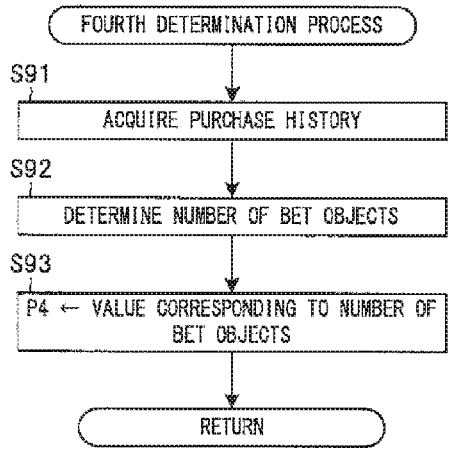

INFORMATION PROCESSING DEVICE, INFORMATION PROCESSING METHOD, AND INFORMATION PROCESSING PROGRAM

CROSS REFERENCE TO RELATED APPLICATIONS

This application is a National Stage of International Application No. PCT/JP2014/066839, filed on Jun. 25, 2014, which claims priority from Japanese Patent Application No. 2013-191073, filed on Sep. 13, 2013, the contents of all of which are incorporated herein by reference in their entirety.

TECHNICAL FIELD

The present invention relates to a technical field of providing information of races.

BACKGROUND ART

For example, in Patent Literature 1, a technique in which a user sets what type of information is needed among various pieces of information about horse racing, while a server distributes only the necessary information needed by the user is disclosed.

CITATION LIST

Patent Literature

Patent Literature 1: JP 2007-087328 A

SUMMARY OF INVENTION

Technical Problem

Information necessary for purchasing betting tickets of racing conducted by public institutions or timing at which the information is needed may change for individual users. However, it should be troublesome for users to set what type of information the users need. Some users do not even know what kind of information the users may need.

The present invention has been made in view of the above situations, and it is an object of the present invention to provide an information processing device, a method, and a program capable of automatically providing information suitable for a user without increasing time or effort of the user.

Solution to Problem

In order to solve the above problem, the invention according to claim 1 is an information processing device, comprising: an acquiring means that acquires, from a storage means that stores histories of operations for purchasing betting tickets of racing conducted by public institutions, a history of operation by a predetermined user for at least one race; a determination means that determines a skill level of the predetermined user about purchasing of the betting tickets based on an operation status identified from the history acquired by the acquiring means; and a control means that controls display of race information in response to a request from the predetermined user according to the skill level determined by the determination means.

According to the invention, an information processing device determines a skill level of a predetermined user according to a history of operation for purchasing betting tickets. The information processing device controls display of race information according to the skill level in response to a request from the predetermined user. Therefore, suitable information for each user can be provided automatically without increasing time or effort of the user.

The invention according to claim 2 is the information processing device according to claim 1, wherein the acquiring means acquires the history that indicates an operation of updating odds of the betting tickets to the latest odds while the odds are displayed, and the determination means determines that the skill level is higher as a frequency of the operation of updating the odds is higher.

According to the invention, the skill levels can be determined properly. This is because the user with a higher skill level tends to study odds in detail, and the user with a higher skill level needs the latest odds.

The invention according to claim 3 is the information processing device according to claim 1 or 2, wherein the acquiring means acquires the history that indicates an operation of displaying information about race objects that participate in the race, and the history that indicates an operation of displaying a forecast of race results of the race, and the determination means determines that the skill level is higher as a ratio of display time of the information about the race object to display time of the information of the forecast is higher.

According to the invention, the skill levels can be determined properly. This is because the user having a higher skill level tends to study information about race objects in detail in order to determine a betting ticket to be purchased, and the user having a higher skill level does not tend to rely on the forecast of others.

The invention according to claim 4 is the information processing device according to any one of claims 1 to 3, wherein the acquiring means acquires the history that indicates an operation of displaying information about race objects that participate in the race, and at least the history that indicates an operation of displaying information of odds of the betting tickets, or the history that indicates an operation of displaying information of forecast of race results of the race, and the determination means determines that the skill level is lower as display time of the information about the race objects is shorter when the information of the odds or the information of the forecast is next displayed after the information about the race objects is displayed.

According to the invention, the skill levels can be determined properly. This is because the user having a lower skill level tends to see odds information or the forecast of others instantly without seeing the information of the race object in detail.

The invention according to claim 5 is the information processing device according to any one of claims 1 to 4, wherein the acquiring means acquires the history that indicates the operation of purchasing of the betting tickets, and the determination means determines that the skill level is higher as at least the number of the race objects or brackets of the race, which have been bet among the race objects that participate in the race, increases.

According to the invention, the skill levels can be determined properly. This is because the user with a higher skill level tends to purchase the betting tickets in more complicated selection. The selection becomes more complicated as the number of objects or brackets of the race increases.

The invention according to claim 6 is the information processing device according to any one of claims 1 to 5, wherein when odds of the betting tickets of the race, stored in an odds storage means that stores the odds corresponding to the request from the predetermined, user and being updated at predetermined timing, are displayed, the control means periodically updates display of the odds based on the latest odds stored in the odds storage means, and decreases a periodic cycle for updating the display of the odds as the skill level determined by the determination means is higher.

According to the invention, odds can be automatically updated at an appropriate cycle according to the skill level. For users having lower skill levels, the cycle of updating the display of the odds is longer. Therefore, a processing load on the information processing device caused by updating the display of the odds can be decreased.

The invention according to claim 7 is the information processing device according to any one of claims 1 to 6, wherein when odds of the betting tickets of the race, stored in an odds storage means that stores the odds corresponding to the request from the predetermined user and being updated at predetermined timing, are displayed, the control means periodically updates display of the odds based on the latest odds stored in the odds storage means only when the skill level determined by the determination means is equal to or higher than a predetermined skill level.

According to the invention, whether the odds should be updated automatically can be appropriately controlled according the skill level. For the users having lower skill levels, the display of the odds does not automatically be updated. Therefore, a processing load on the information processing device caused by updating the display of the odds can be decreased.

The invention according to claim 8 is the information processing device according to any one of claims 1 to 7, wherein the control means causes information about race objects that participate in the race corresponding to the request from the predetermined user to be displayed, and increases an amount of information about the race object as the skill level determined by the determination means is higher.

According to the invention, an appropriate amount of information about the race objects can be provided according to the skill level. This is because the user having a higher skill level tends to study the information about race objects in detail.

The invention according to claim 9 is the information processing device according to any one of claims 1 to 8, wherein the determination means determines the skill level based on the history that has been stored on or before the betting ticket is purchased among the history stored in the storage means.

According to the invention, the information processing device can acquire appropriate history as a history of operation for purchasing the betting ticket of the race.

The invention according to claim 10 is an information processing method performed by a computer, the method comprising: an acquiring step of acquiring, from a storage means that stores histories of operations for purchasing betting tickets of racing conducted by public institutions, a history of operation by a predetermined user for at least one race; a determination step of determining a skill level of the predetermined user about purchasing of the betting tickets based on an operation status identified from the history acquired in the acquiring step; and a control step of controlling display of race information in response to a request from the predetermined user according to the skill level determined in the determination step.

The invention according to claim 11 is an information processing program for causing a computer to function as: an acquiring means that acquires, from a storage means that stores histories of operations for purchasing a betting tickets of racing conducted by public institutions, a history of operation by a predetermined user for at least one race; a determination means that determines a skill level of the predetermined user about purchasing of the betting tickets based on an operation status identified from the history acquired by the acquiring means; and a control means that controls display of race information in response to a request from the predetermined user according to the skill, level determined by the determination means.

Advantageous Effects of Invention

According to the present invention, an information processing device determines a skill level of a predetermined user according to a history of operation for purchasing betting tickets. The information processing device controls display of race information according to the skill level in response to a request from the predetermined user. Therefore, suitable information for each user can be provided automatically without increasing time or effort of the user.

BRIEF DESCRIPTION OF DRAWINGS

FIG. 2 illustrates a display example of a racecard page.

FIG. 3A illustrates a display example of an odds page that displays Win and Place odds. FIG. 3B illustrates a display example of a forecast list page.

FIG. 4A is a block diagram illustrating an example of a brief structure of a horse betting ticket sale agency server 1 according to the embodiment. FIG. 4B illustrates an example of functional blocks of the horse betting ticket sale agency server 1 according to the embodiment.

FIG. 5A illustrates an example of contents to be registered in a member information DB 12*a*. FIG. 5B illustrates an example of contents to be registered in a race information DB 12*b*. FIG. 5C illustrates an example of contents to be registered in a horse betting ticket information DB 12*c*. FIG. 5D illustrates an example of contents to be registered in an odds information DB 12*d*. FIG. 5E illustrates an example of contents to be registered in an operation history DE 12*e*. FIG. 5F illustrates an example of contents to be included in detailed information when the operation type is "view". FIG. 5G illustrates an example of contents to be included in the detailed information when the operation type is "manual update". FIG. 5H illustrates an example of contents to be included in the detailed information when the operation type is "purchase". FIG. 5I illustrates an example of contents to be registered in a forecast information DB 12*f*.

FIG. 6A illustrates an example of determination methods of a skill level. FIG. 6B illustrates an example of controlling methods of controlling display of information about races.

FIG. 7 illustrates a display example of racecard page when the user is a beginner.

FIG. 13A is a flowchart illustrating an example of third determination process by the system control unit 14 of the horse betting ticket sale agency server 1 according to the embodiment. FIG. 13B is a flowchart illustrating an example of fourth determination process by the system control unit 14 of the horse betting ticket sale agency server 1 according to the embodiment.

DESCRIPTION OF EMBODIMENTS

An embodiment of the present invention will be described in detail below by referring to the accompanying drawings. The embodiment described below is an embodiment when the present invention is applied to an information processing system in which a user purchases a horse betting ticket (winning horse betting ticket) in horse racing by Internet wagering. Horse racing is an example of races in the present invention. Race horses are examples of objects of the race in the present invention. Horse betting tickets are examples of betting tickets in the present invention. Application of the present invention is not limited to horse racing. The present invention can be applied to any race for which betting tickets can be purchased. Such races include bicycle races, boat races, and auto racing conducted by public institutions.

[1. Brief Structure and Functions of Information Processing System]

Figure 1:
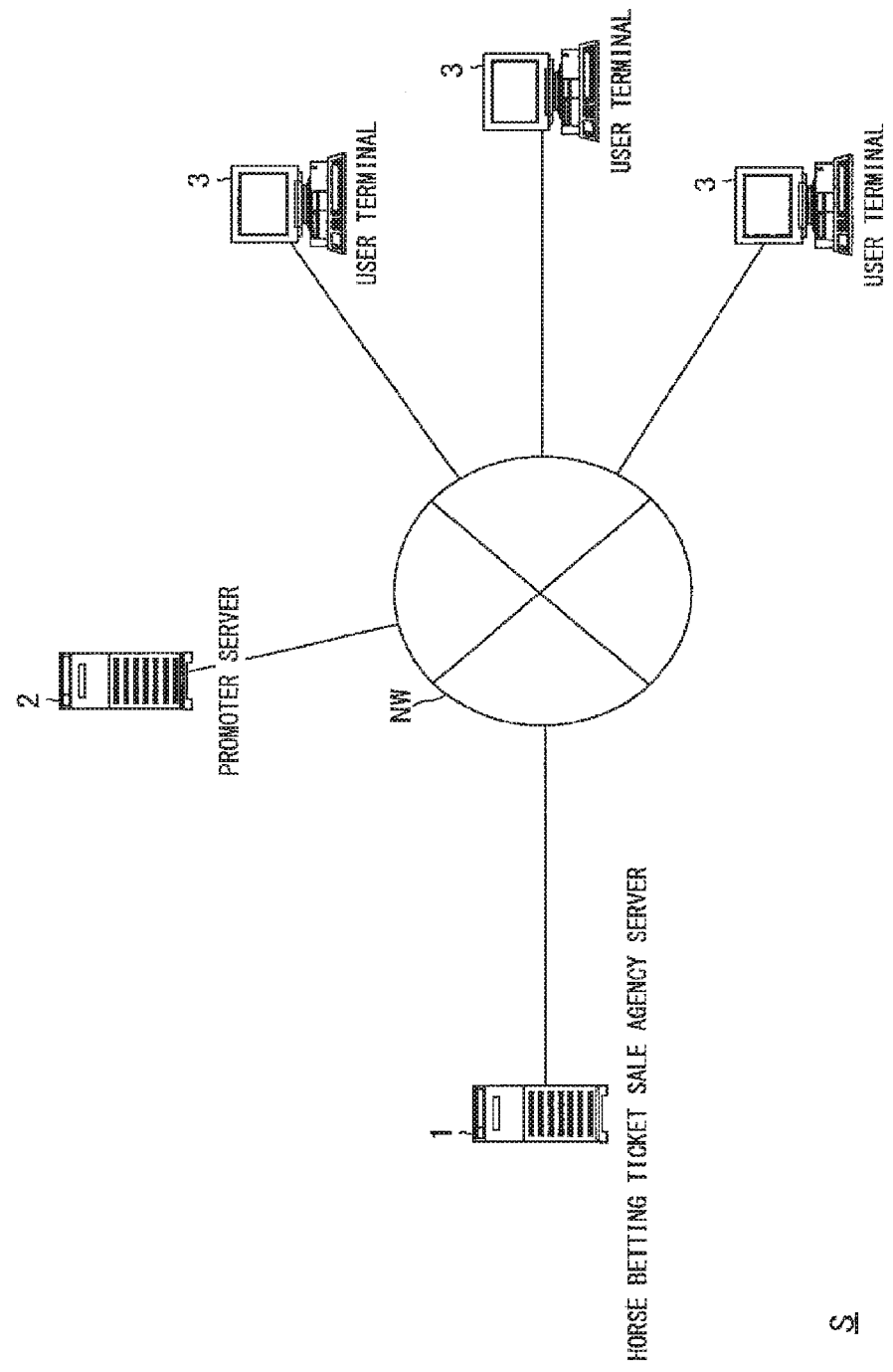
FIG. 1 illustrates an example of a brief structure of an information processing system S according to an embodiment.

First, a structure of an information processing system S according to the present embodiment is described according to FIG. 1. FIG. 1 illustrates an example of a brief structure of the information processing system S according to the present embodiment.

As illustrated in FIG. 1, the information processing system S includes a ho s betting ticket sale agency server 1, a promoter server 2, and a plurality of user terminals 3. The horse betting ticket sale agency server 1, the promoter server 2, and the user terminals 3 mutually transmit and receive data using a communications protocol, such as TCP/IP standards, via a network NW. The network NW is constituted by, for example, the Internet, a dedicated communication line (e.g., a community antenna television (CATV) line), a mobile communication network (including a base station or the like), and a gateway.

The horse betting ticket sale agency server 1 is a server device that handles various processing about a horse racing website for selling horse betting tickets on behalf of a promoter of horse racing. The horse betting ticket sale agency server 1 is an example of the information processing device of the present invention. The horse betting ticket sale agency server 1 acquires information of a race announced by the promoter from the promoter server 2. The horse betting ticket sale agency server 1 transmits a webpage in response to a request from any of the user terminals 3. The horse betting ticket sale agency server 1 provides, for example, information about the race. The information about the race to be provided includes, for example a racecard, odds, forecast, and race results. The horse betting ticket sale agency server 1 may execute processing, such as reception of purchase of horse betting tickets and payoff of the winning horse betting tickets. A user of the horse racing website selects the selection and the number of horse betting tickets to be purchased when purchasing the horse betting tickets. The selection includes the type of bet (betting method) and the race horses or brackets that are bet. The race horses or brackets that are bet designated by horse numbers or bracket numbers. When the type of bet designates finishing orders in addition to the combination of horse numbers, the selection also includes the order of finish of the race horses that are bet. The horse betting ticket sale agency server 1 also receives forecast of the race from users in response to the request from the user terminals 3. When a user post the forecast, the user selects a favorite horse, a rival horse, a dark horse, and a lower level horse as horses that the user forecasts to finish in a higher rank.

The horse betting ticket sale agency server 1 determines skill, levels of users in purchasing horse betting tickets. In accordance with the determined skill level, the horse betting ticket sale agency server 1 controls display of the information of the race. The horse betting ticket sale agency server 1 thus provides appropriate information to individual users. The skill levels represent, for example, how much the users are accustomed to purchasing of the horse betting tickets. That is, the skill levels represent how much the users are accustomed to betting the race horses. To determine the skill levels, the horse betting ticket sale agency server 1 uses a history of the operation for purchasing the horse betting ticket. The history is referred to as the operation history. Determination methods of the skill levels and controlling methods of the display of information will be described later.

The user terminals 3 are terminals of users who use the horse racing website. The user terminals 3 access the horse betting ticket sale agency server 1 in response to the operation by the users, and receive and display the webpage from the horse betting ticket sale agency server 1. The user terminals 3 include software, such as browsers and email clients. For example, personal computers, personal digital assistant (PDA) devices, mobile information terminals, such as smart phones, or mobile phones may be used as the user terminals 3.

[2. Race Information]

Various webpages in which race information is displayed exist in the horse racing website. For example, there are a racecard page, an odds page, a forecast list page, and the like. The racecard page is a webpage that displays information of race horses that participate in a race designated by the user. Information of entry of racehorses is referred to as horse entry information. The horse entry information is an example of the information of objects of the race in the present invention. FIG. 2 illustrates a display example of the racecard page. FIG. 2 only illustrates the horse entry information of one racehorse, but the information of all racehorses having been entered in the race is actually displayed. As illustrated in FIG. 2, the horse entry information to be displayed includes a bracket number, a horse number, basic attributes of the racehorse, attributes of the racehorse at the race, the weight of the racehorse when the horse is the object of multiple wins, an increase/decrease of the weight of the horse, information of last 5 races, past records, and so on. The basic attributes of the racehorse includes the name of father (sire) of the racehorse, the name of the racehorse, the name of mother (dam) of the racehorse, the odds of the Win bet, the date of birth, the name of the owner, and the name of the ranch where the race horse is bred. The attributes of the racehorse at the race includes the age, the coat color, the weight, the name of the jockey, and the name of the trainer. The information of last 5 races includes the order of finish, the racecourse condition, the number of entry horses, the place of the race, the date of the race, the name of the race, the grade, the distance, the right-handed racecourse or the left-handed racecourse, the type of the racecourse, popularity, the name of the jockey, the burden weight, the running rime, the margin from the first or second place racehorse, the running time of last 600 meter, the weight of the horse, the starting gate number, the position at each corner, and the name of the first or second racehorse. The past record includes the record of all races, the record at the racecourse where the race corresponding to the racecard page is held, the record for the distance equal to the distance of the race corresponding to the racecard page, the record at the racecourse where the race corresponding to the racecard page is held, and the record for each distance.

The odds page is a webpage that displays the odds of the race designated by the user. The odds page is provided, for example, for each type of bet (betting method). FIG. 3A illustrates a display example of the odds page that displays the odds of the Win and Place bets. As illustrated in FIG. 3A, the odds page includes a list 110 and an update link 120. The list 110 includes, for example, the bracket numbers, the horse numbers, the names of the racehorses, odds areas 111. For example, in the odds areas 111, the odds for each selection of the Win bet and the Place bet are displayed. During the display of the odds page, the odds displayed in the odds areas ill are updated to the latest odds at predetermined cycles. Updating the odds at the predetermined cycles is referred to as automatic update. When the user operates to select the update link 120, the odds that are currently displayed in the odds areas 111 at the time of the operation are updated to the latest odds. Updating the odds by the operation of the user is referred to as manual update. In the odds page, the automatic update of the odds may not always be performed. Only the manual update of the odds may be allowed.

The forecast list page is a webpage that displays a list of forecast of the race designated by the user. The forecast list page is an example of the forecast information of the race results in the present invention. FIG. 3B illustrates a display example of the forecast list page. As illustrated in FIG. 3B, the forecast list page includes, for example, the horse numbers of favorite horses, rival horse, dark horses, and lower level horse, as well as nicknames of forecasters, forecast hit rates, and forecast response rates.

[3. Structure of Horse Betting Ticket Sale Agency Server]

Next, the structure of the horse betting ticket sale agency server 1 is described by referring to FIGS. 4 and 5.

FIG. 4A is a block diagram illustrating an example of brief structure of the horse betting ticket sale agency server 1 according to the embodiment. As illustrated in FIG. 4A, the horse betting ticket sale agency server 1 includes a communication unit 11, a storage unit 12, an input/output interface 13, and a system control unit 14. The system control unit 14 and the input/output interface 13 are connected via a system bus 15.

The communication unit 11 is configured to connect to the network NW to control a communication state with the user terminals 3 or the like.

The storage unit 12 is an example of a storage means and an odds storage means of the present invention. The storage unit 12 is constituted by, for example, a hard disc drive. The storage unit 12 includes databases, such as a member information DB 12a, a race information DB 12b, a horse betting ticket information. DB 12c, an odds information DB 12d, an operation history DB 12e, and a forecast information DB 12f. The "DB" stands for the database.

FIG. 5A illustrates an example of contents to be registered in the member information DB 12a. In the member information DB12a, information of each member who is registered as a member of the horse racing website is registered. Specifically, in the member information DB 12a, a user ID, a password, a nickname, a name, the date of birth, sex, zip code, an address, a telephone number, an e-mail address, and the like of individual users are correlated with each other and registered.

FIG. 5B illustrates an example of contents to be registered in the race information DB 12b. In the race information DB 12b, information of each race is registered. Specifically, in the race information DB 12b, a race ID, the name of the race, the grade, the name of the racecourse, the date of the race, post time, the race number, the horse entry information, and the like are correlated with each other and registered. The race ID indicates identification information of the race. As mentioned above, the horse entry information includes the bracket numbers, the horse numbers, the basic attributes, the attributes at the race, the weight of the horse when the horse is the object of multiple wins, an increase/decrease of the weight of the horse, the information of last 5 races, and past records. The horse entry information is registered for each racehorse.

FIG. 5C illustrates an example of contents to be registered in horse betting ticket information DB 12c. In the horse betting ticket information DB 12c, the horse betting ticket information of the horse betting tickets to be sold is registered for each horse betting ticket. Specifically, a race ID, a horse betting ticket ID, the type of bet, the numbers of bet objects, and the like are correlated with each other and registered in the horse betting ticket information DB 12c. The horse betting ticket ID is the identification information of the horse betting ticket. The race ID indicates which race the horse betting ticket indicated by the horse betting ticket ID is for. The numbers of the bet objects indicate the horse numbers or the bracket numbers. One or more numbers of bet objects are registered according to the types of bet. A combination of the type of bet and the numbers of bet objects represent the selection.

FIG. 5D illustrates an example of contents to be registered in the odds information DB 12d. In the odds information DB 12d, the odds information of the odds of the horse betting tickets is registered for each horse betting ticket at predetermined time intervals. Specifically, a race ID, a horse betting ticket ID, the date of update, the odds, and the like are correlated with each other and registered, in the odds information DB 12d. The promoter server 2 transmits the odds information at predetermined time intervals (e.g., every one minute) to the horse betting ticket sale agency server 1. The system control unit 14 registers received odds information to the odds information DB 12d. The date of update indicates the date when the odds of the horse betting ticket indicated by the horse betting ticket ID have been updated by the promoter server 2.

FIG. 5E illustrates example contents to be registered in the operation history DB 12e. In the operation history DB12e, the operation history of the user in the horse racing website is registered. When the user performs some operation in the horse racing website, the user terminal 3 transmits a request corresponding to the operation to the horse betting ticket sale agency server 1. The system control unit 14 registers the operation history every time the request is received. Specifically, a user ID, the date of operation, detailed information, and the like are registered in the operation history DE 12e. The user ID indicates the user who has performed the operation. The date of operation indicates the date when the operation is performed. Specifically, the date of operation is the date when the operation history is registered in the operation history DB 12e. The detailed, information is detailed information of the operation. The detailed information may be, for example, a uniform resource locator (URL) included in the request having been transmitted from the individual user terminals 3.

The detailed information at least includes the operation type. The operation type includes, for example, "view", "manual update", and "purchase". The "view" indicates the operation to display the webpage. When the operation type is "view", the operation history is referred to as a viewing history. When the operation type is "view", the date of operation is referred to as a viewing date. FIG. 5F illustrates an example of contents to be included in the detailed information when the operation type is "view". When the operation type is "view", the detailed information further includes the race ID, the page type, and the like. The race ID indicates which race the viewed webpage is about. The page type indicates the type of the viewed webpage. The types of the webpage include the racecard page, the odds page, the forecast list page, and the like.

The "manual update" indicates the operation of manually updating the odds. When the operation type is "manual update", the operation history is referred to as the manual update history. FIG. 5G illustrates an example of contents to be included in the detailed information when the operation type is "manual update". When the operation type is "manual update", the detailed information further includes the race ID, and the like. The race ID indicates the race whose odds have been updated manually.

The "purchase" indicates the operation of purchasing the horse betting ticket. When the operation type is "purchase", the operation history is referred to as the purchase history. When the operation type is "purchase", the date of operation is referred to as the date of purchase. FIG. 5H illustrates an example of contents to be included in the detailed information when the operation type is "purchase". When the operation type is "purchase", the detailed information further includes, for example, the race ID, the horse betting ticket ID, the type of bet, the numbers of bet objects, and the number of purchased tickets, and the like. The horse betting ticket ID indicates the horse betting ticket purchased by the user. A combination of the race ID, the horse betting ticket ID, the type of bet, and the numbers of bet objects is the same as the combination of the race ID, the horse betting ticket ID, the type of bet, and the numbers of the bet objects that has been registered in the horse betting ticket information. DB 12c.

FIG. 5I illustrates an example of contents to be registered in the forecast information DB 12f. In the forecast information DB 12f, the forecast information indicating the forecast of the race by the user is registered every time the horse betting ticket sale agency server 1 receives the forecast. Specifically, a user ID, the date of post, a race ID, the horse number of the favorite horse, the horse number of the rival horse, the horse number of the dark horse, the horse number of the lower level horse, and the like are correlated with each other and registered in the forecast information DB 12f. The user ID indicates the user who made the forecast. The date of post indicates the date when the forecast is posted. The race ID indicates which race the received forecast is for.

Next, other information stored in the storage unit 12 is described. The storage unit 12 stores various types of data including, for example, HTML documents, extensible markup language (XML) documents, image data, text data, and electronic documents. The storage unit 12 also stores various setting values, threshold values, constant, and the like.

The storage unit 12 further stores various programs including an operating system, a world wide web (WWW) server program, a database management system (DBMS), and a horse betting ticket issue proxy management program. The horse betting ticket issue proxy management program is a program for executing processing, such as reception of purchase of the horse betting ticket, determination of the skill levels, and the display control of webpages. The horse betting ticket issue proxy management program is an example of the information processing program of the present invention. The various types of programs may be obtained, for example, from other server devices via the network NW, or may be recorded in a recording medium, such as a digital versatile disc (DVD), and read via a drive apparatus. The horse betting ticket issue proxy management program may also be provided as a program product.

The input/output interface 13 is configured to perform interface processing between the system control unit 14, and the communication, unit 11 and the storage unit 12.

The system control unit 14 is constituted by a CPU 14a, a read only memory (ROM) 14b, a random access memory (RAM) 14c, or the like. The system control unit 14 performs, as a computer, various types of processing about the horse racing website by reading and executing various programs by the CPU 14a.

The horse betting ticket sale agency server 1 may be implemented by a plurality of server devices. For example, server devices, such as a server device that executes processing of, for example, reception of horse betting ticket purchasing, a server device that determines the skill levels, a server device that transmits a webpage in response to the request from the user terminals 3, and a server device that manages databases, may be connected with each other, for example, by LAN.

[4. Details of Functions of System Control Unit]

FIG. 4B illustrates an example of functional block of the horse betting ticket sale agency server 1 according to the embodiment. The system control unit 14 reads and executes various programs stored in the storage unit 12, and functions as a history acquisition unit 141, a skill level determination unit 142, a display control unit 143, and so on, as illustrated in FIG. 4B. The history acquisition unit 141 is an example of an acquisition means of the present invention. The skill level determination unit 142 is an example of a determination means of the present invention. A display control unit 143 is an example of a control means of the present invention.

The history acquisition unit 141 acquires the operation history of a predetermined user from the operation history DB 12e at least for a race. The operation history that the history acquisition unit 141 may acquire includes, for example, a viewing history of the racecard page, a viewing history of the odds page, a viewing history of the forecast list page, a manual update history of the odds, and a purchase history. The users cannot see which racehorse or bracket they should bet on without any information of the racehorses that participate in the race. The operation of displaying the racecard page, therefore, is also the operation for purchasing the horse betting tickets. In addition, the users cannot judge which racehorse or bracket is appropriate for betting without knowing the odds. The operation of displaying the odds page and the operation of manually updating the odds, therefore, are also the operation for purchasing the horse betting tickets. The users may determine the racehorse or bracket to be bet by referring to the forecast by others. The operation of displaying the forecast list page, therefore, is also the operation for purchasing the horse betting tickets.

The skill level determination unit 142 determines the skill level of the predetermined user based on the operation status identified from the operation history acquired by the history acquisition unit 141. FIG. 6A illustrates an example method of determining the skill levels. Methods 1 to 4 are provided as examples of the determination method in FIG. 6A. In the method 1, the history acquisition unit 141 acquires the manual update history of the odds. In this case, the skill level determination unit 142 calculates the frequency of the manual update of the odds while the odds page is displayed. The frequency is referred to as the frequency of the manual update. The skill level determination unit 142 determines that the skill level is higher as the frequency of the manual update is higher. This is because the users having a higher skill level tend to study the odds in detail. Accordingly, the users having a higher skill level tend to need the latest odds. The odds are updated periodically in the odds page, as mentioned above. If, however, the users feel that the updating cycle of the odds is too long, the users proceed to the manual update operation. On the other hand, the users having a lower skill level do not tend to care for detailed figures of the odds. Thus, the frequency of the manual update operation is lower for the users having a lower skill level.

In the method 2, the history acquisition unit 141 acquires the viewing history of the racecard page and the viewing history of the forecast list page. In this case, the skill level determination unit 142 calculates a ratio of display time. The ratio of display time is a ratio of the racecard page to display time of display time of the forecast list page. The skill level determination unit 142 determines that the skill level is higher as the ratio of display time is higher. This is because the users having a higher skill level, tend to study the horse entry information in detail and purchase the horse betting tickets without relying on the forecast by others. Thus, the users having a higher skill level spend longer time in viewing the racecard page and spend shorter time in viewing the forecast list page. On the other hand, the users having a lower skill level tend to rely on the forecast by others without sufficiently studying the horse entry information. One reason for this is that the users having a lower skill level may not know how to use some information of the horse entry information in determining the racehorses or brackets to be bet.

In the method 3, the history acquisition unit 141 acquires the viewing history of the racecard page, the viewing history of the odds page, and the viewing history of the forecast list page. In this case, the skill level determination unit 142 determines whether the user has viewed the odds page or the forecast list page subsequent to displaying the racecard page. If it is determined, that the user has viewed the odds page or the forecast list page, the skill level determination unit 142 calculates the display time of the racecard page. The skill level determination unit 142 determines that the skill level is lower as the display time is shorter. This is because the users having a lower skill level tend to instantly view the odds or forecast by others without sufficiently studying the horse entry information.

In the method 4, the history acquisition unit 141 acquires the purchase history. In this case, the skill level determination unit 142 calculates at least the number of racehorses or brackets that the user has bet on by purchasing the horse betting tickets. This number is referred to as the number of bet objects. The skill level determination unit 142 determines that the skill level is higher as the number of bet objects is larger. This is because the users having a higher skill, level tend to purchase the horse betting tickets in more complicated selection. The selection becomes more complicated as the number of bet objects increases. The skill level determination unit 142 may specify the number of bet objects based on the types of bet of the horse betting tickets. The number of horse numbers or bracket numbers of the bet racehorses is determined according to the type of bet. The number of the horse numbers and bracket numbers indicate the number of bet objects for one betting ticket. The types of bet include, for example, Win, Place, Bracket Quinella, Quinella, Bracket Exacta, Exacta, Wide, Trio, and Trifecta bets. The number of bet objects for the Win and Place bet. The number of bet objects for the Bracket Quinella, Quinella, Bracket Exacta, Exacta, and Wide bets is 2. The number of bet objects for the Trio and Trifecta bets is 3. The user may purchase a plurality of horse betting tickets for a race. For example, the user may purchase betting tickets of a formation type bet or a box type bet. Therefore, the skill level determination unit 142 may set, for example, the number of the horse numbers or bracket numbers of more than one horse betting tickets as the number of bet objects. For example, the user may purchase the Quinella horse betting ticket by designating 1-2, 2-3, and 3-1. In this case, the user has bet on each of the racehorses having the horse numbers 1, 2, and 3. Thus, the number of bet objects is 3.

The skill level determination unit 142 may determine the skill level based solely on the operation history having been registered on or before the purchase of the horse betting ticket among the entire operation history of the predetermined user on a certain race. This is because, if the user operates the horse racing website after the purchase of the horse betting ticket, the user may probably operate not for purchasing the horse betting tickets. In this case, the skill level determination unit 142 determines the skill level without using the operation history of the predetermined user for the race in which the user has not purchased the horse betting ticket. This is because the user may probably have operated not for purchasing the horse betting ticket for the race in which the user has not purchased the horse betting ticket.

The skill level determination unit 142 may determine the skill level using only one method of the methods 1 to 4. For example, when only the method 1 is used, the skill level determination unit 142 may use the frequency of the manual update as the skill level. When only the method 2 is used, the skill level determination unit 142 may use the ratio of the display time as the skill level. When only the method 3 is used, the skill level determination unit 142 may use the ratio of the display time of the racecard page as the skill level. When only the method 4 is used, the skill level determination unit 142 may use the number of bet objects as the skill level. The skill level determination unit 142 may determine the skill level using more than one method of the methods 1 to 4. When more than one method is used, the skill level determination unit 142 may calculate points for each method. The skill level determination unit 142 may determine the skill level based on the points calculated for each method. The skill level determination unit 142 may calculate a representative value, such as a sum or average value of the points calculated for each method, and use the representative value as the skill level.

In the present embodiment, the skill level determination unit 142 calculates the points for each method using all methods 1 to 4. The skill level determination unit 142 then determines the skill level based on the calculated points. The skill level determination unit 142 determines whether the user is a beginner or an expert as an example of the skill level. The skill levels may include at least three levels.

The display control unit 143 controls the display of the information of the race according to the skill levels having been determined by the skill level determination unit 142. FIG. 6B illustrates an example method of controlling the display of information of the race. FIG. 6B illustrates control examples 1 to 3. In the control 1, the webpage to be controlled is the odds page. In the control 1, the display control unit 143 controls the automatic update cycle of the odds. The cycle is referred to as the update cycle. Specifically, the display control unit 143 decreases the update cycle as the skill level is higher. This is because, as mentioned above, the users having a higher skill level tend to need the latest odds.

In the control 2, the webpage to be controlled is the odds page. In the control 2, the display control unit 143 controls whether to execute the automatic update of the odds. Specifically, the display control unit 143 controls such that the automatic update of the odds is executed only when the skill level is equal to or higher than a predetermined skill level, while the automatic update of the odds is not executed when the skill level is lower than the predetermined skill level. The reason for this is the same as the reason described in the case of the control 1. When the skill level is at least level 3, the display control unit 143 may combine the controls 1 and 2. For example, the skill levels may include beginner, intermediate, and advanced levels. The display control unit 143 does not execute the automatic update for the beginner level, while executing the automatic update for the intermediate and advanced levels. The display control unit 143 makes the update cycle of the advanced level be shorter than the update cycle of the intermediate level.

In the control 3, the webpage to be controlled is the racecard page. In the control 3, the display control unit 143 controls the amount of horse entry information. Specifically, the display control unit 143 increases the amount of information as the skill level is higher. This is because, as mentioned above, the users having a higher skill level tend to study the horse betting tickets to be purchased based on a larger amount of information. Thus, it is advantageous that detailed information is displayed for the users having a higher skill level. On the other hand, the users having a lower skill level tend to study the horse betting tickets to be purchased only based on part of the information among the displayed information even when detailed information is displayed. As the amount of information increases, more information that is not used by the user is displayed. Such information may probably look unpleasant to the users having a lower skill level. In addition, the users having a lower skill level may have difficulty in finding necessary information. The display control unit 143, therefore, decreases the amount of information as the skill level is lower.

For example, the skill level determination unit 142 determines whether the user is a beginner or an expert. In the case of the expert, the skill level determination unit 142 controls such that the racecard page illustrated in FIG. 2, for example, is displayed. FIG. 7 illustrates a display example of the racecard page when the user is a beginner. For the beginners, the skill level determination unit 142 controls such that the racecard page illustrated in FIG. 7, for example, is displayed. As illustrated in FIG. 7, none of the names of owners and breeders among the basic attributes of the racehorses is displayed. In addition, among the information of last five races, none of the running time of last 600 meters, the weight of the horse, the number of starting gate, positions at each corner, and the name of the winning horse or the horse that has finished second is not displayed. Among the past record, the record by each distance is not displayed. Among the horse entry information, the information that is not displayed for the beginners is referred to as non-required information. Among the horse entry information, the information other than the non-required information is referred to as required information. The skill level determination unit 142 may not determine the skill levels according to the determination method of the skill levels or the registration status of the operation history. In this case, the display control unit. 143 may control such that the racecard page illustrated in FIG. 2, for example, is displayed.

[5. Operation of Information Processing System]

Figure 8:
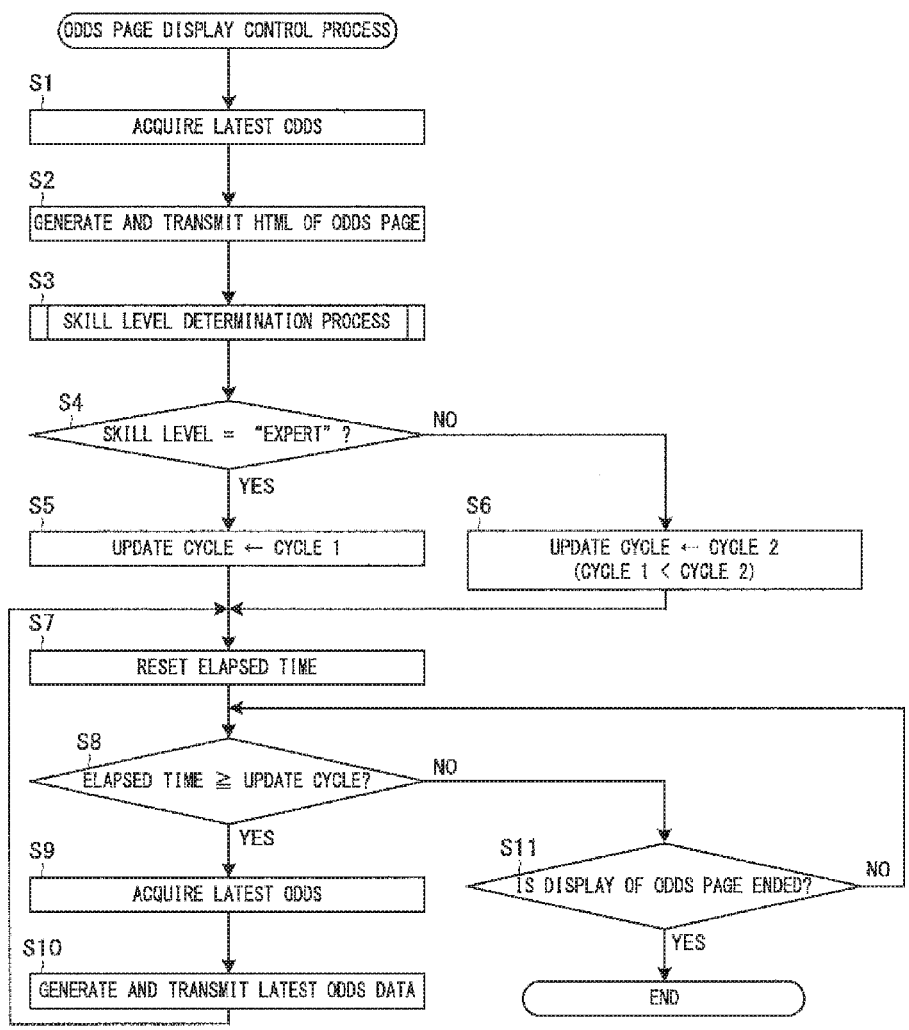
FIG. 8 is a flowchart illustrating an example of odds page display control process by a system control unit 14 of the horse betting ticket sale agency server 1 according to the embodiment.

Next, the operation of the information processing system S is described by referring to FIGS. 8 to 13. FIG. 8 is a flowchart illustrating an example of odds page display control process by the system control unit 14 of the horse betting ticket sale agency server 1 according to the embodiment. In the horse racing website, the user operates to display an odds page of a desired race. In response to this, the user terminal 3 transmits a request for the odds page to the horse betting ticket sale agency server 1. The request for the odds page includes the user ID and the race ID. The user ID indicates the user who has operated to display the webpage. The user who has operated is referred to as the target user. The target user is an example of the predetermined user of the present invention. The race ID indicates the race for which the webpage is displayed. The race for which the webpage is displayed is referred to as the target race. The target race is an example of the race corresponding to the request from the predetermined user of the present invention. Upon receipt of the request for the odds page, the system control unit 14 starts the odds page display control process.

As illustrated in FIG. 8, the display control unit 143 acquires the latest odds information (step S1). Specifically, the display control unit 143 searches the odds information DB 12d for the odds information corresponding to the race ID of the target race included in the request. The display control unit 143 then acquires the odds information having the newest update time among the found odds information.

The display control unit 143 transmits the HTML page of the odds page (step S2). Specifically, the display control unit 143 acquires the odds included in the acquired odds information. The display control unit 143 generates the HTML page including the acquired odds. The display control unit 143 transmits the generated HTML page to the user terminal. 3 that has transmitted the request. The user terminal 3 displays the odds page (e.g., FIG. 3A) based on the received HTML page.

The display control unit 143 executes skill level determination process (step S3). In the skill, level determination process, the skill level determination unit 142 determines the "expert" or "beginner" level as the skill level of the target user. The details of the skill level determination unit 142 will be described later. In the present embodiment, the skill level determination unit 142 determines the Skill levels at the time of transmitting the webpage of which the display is controlled. However, the skill level determination unit 142 may determine the skill levels at the timing different from the transmission of the webpage. For example, the skill level determination unit 142 may periodically determine the skill levels of individual users. Alternatively, the skill level determination unit 142 may determine the skill levels of the users who have performed operations indicated by the operation history, such as a purchase history, when the operation history is registered in the operation history DB 12*e*.

The display control unit 143 then determines whether the skill level determined by the skill level determination process is the "expert" level (step S4). At this time, if the display control unit 143 determines that the skill level is the "expert" level (step S4: YES), the process proceeds to step S5. In step S5, the display control unit 143 sets the update cycle to a cycle 1 that has previously been stored in the storage unit 12. On the other hand, if the display control unit 143 determines that the skill level is not the "expert" level (step S4: NO), the process proceeds to step S6. In step S6, the display control unit 143 sets the update cycle to a cycle 2 that has previously been stored in the storage unit 12. The cycle 2 is longer than the cycle 1. When the display control unit 143 ends step S5 or 66, the process proceeds to step S7.

In step S7, the display control unit 143 resets the elapsed time to 0. The display control unit 143 starts counting the elapsed time from the current, time. The display control unit 143 then determines whether the elapsed time is equal to or longer than the update cycle (step S8). At this time, if the display control unit 143 determines that the elapsed time is shorter than the update cycle (step S8: NO), the process proceeds to step S11. On the other hand, if the display control unit 143 determines that the elapsed time is equal to or longer than the update cycle (step S8: YES), the process proceeds to step S9.

In step S9, the display control unit 143 acquires the latest odds information. The processing of step S9 is the same as the processing of step S1. The display control unit 143 then generates update data of the odds based on the latest odds information (step S10). The update data of the odds is used by the user terminal 3 to update the odds displayed on the odds page. For example, the display control unit 143 may generate data in the HTML format corresponding to the odds areas 111 of the odds page. At this time, the display control unit 143 puts the odds included in the latest odds information into the update data of the odds. The display control unit 143 transmits the generated update data of the odds to the user terminal 3 that has transmitted the request. Then, the display control unit 143 causes the process to proceed to step S7. The user terminal 3 rewrites the HTML document of the odds page displayed on the screen based on the update data of the odds. The user terminal 3 thus displays the latest odds on the odds page.

In step S11, the display control unit 143 determines whether the display of the odds page is ended. For example, the display control unit 143 determines that the display of the odds page has ended when the horse betting ticket sale agency server 1 receives the request for another webpage from the user terminal 3. At this time, if the display control unit 143 determines that the display of the odds page is not ended (step S11: NO), the process proceeds to step S8. On the other hand, if the display control unit 143 determines that the display of the odds page is ended (step S11: YES), the odds page display control process is ended.

FIG. 8 illustrates the example of processing using the control 1 illustrated in FIG. 6B. When the control 2 is used, the display control unit 143 should end the odds page display control process if it is determined that the skill level is not the "expert" level in step S4 (step S4: NO). As a result of this, if the target user is a beginner, the user terminal 3 does not automatically update the odds of the odds page.

Figure 9:
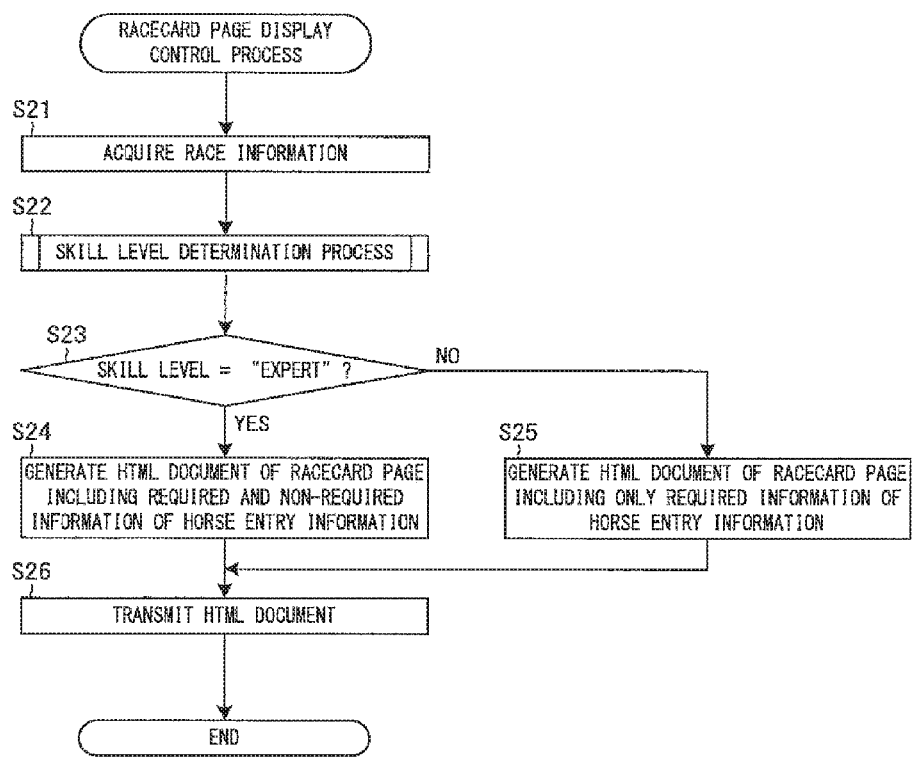
FIG. 9 is a flowchart illustrating an example of racecard page display control processing by the system control unit 14 of the horse betting ticket sale agency server 1 according to the embodiment.

FIG. 9 is a flowchart illustrating an example of racecard page display control process by the system control unit 14 of the horse betting ticket sale agency server 1 according to the embodiment. In the horse racing website, the user displays the racecard page of a desired race. The user terminal 3 then transmits a request for the racecard page to the horse betting ticket sale agency server 1. The request for the racecard page includes the user ID of the target user and the race ID of the target race. Upon receipt of the request for the racecard page, the system control unit 14 starts the racecard page display control process.

As illustrated in FIG. 9, the display control unit 143 acquires, from the race information DR 12*b*, the race information corresponding to the race ID of the target race included in the request (step S21). The display control unit 143 then executes skill level determination process (step S22). The display control unit 143 then determines whether the skill level, which is determined in the skill level determination process, is the "expert" level (step S23). At this time, if the display control unit 143 determines that the skill level is the "expert" level (step S23: YES), the process proceeds to step S24. On the other hand, if the display control unit 143 determines that the skill level is not the "expert" level (step S23: NO), the process proceeds to step S25.

In step S24, the display control unit 143 generates the HTML document of the racecard page for the expert based on the race information. At this time, the display control unit 143 acquires, from the entry horse information included in the race information, the entire horse entry information including the required and non-required information. The display control unit 143 generates the HTML document including the required information. The display control unit 143 causes the process to proceed to step S26.

In step S25, the display control unit 143 generates the HTML document of the racecard page for beginners based on the race information. At this time, the display control unit 143 only acquires the required information from the race information. The display control unit 143 generates the HTML document including the horse entry information. The display control unit 143 causes the process to proceed to step S26.

In step S26, the display control unit 143 transmits the generated HTML document to the user terminal 3 that has transmitted the request. When the step S26 is ended, the display control unit 143 ends the racecard page display control process. The user terminal 3 displays the racecard page (e.g., FIG. 2 or 7) based on the received HTML page.

Figure 10:
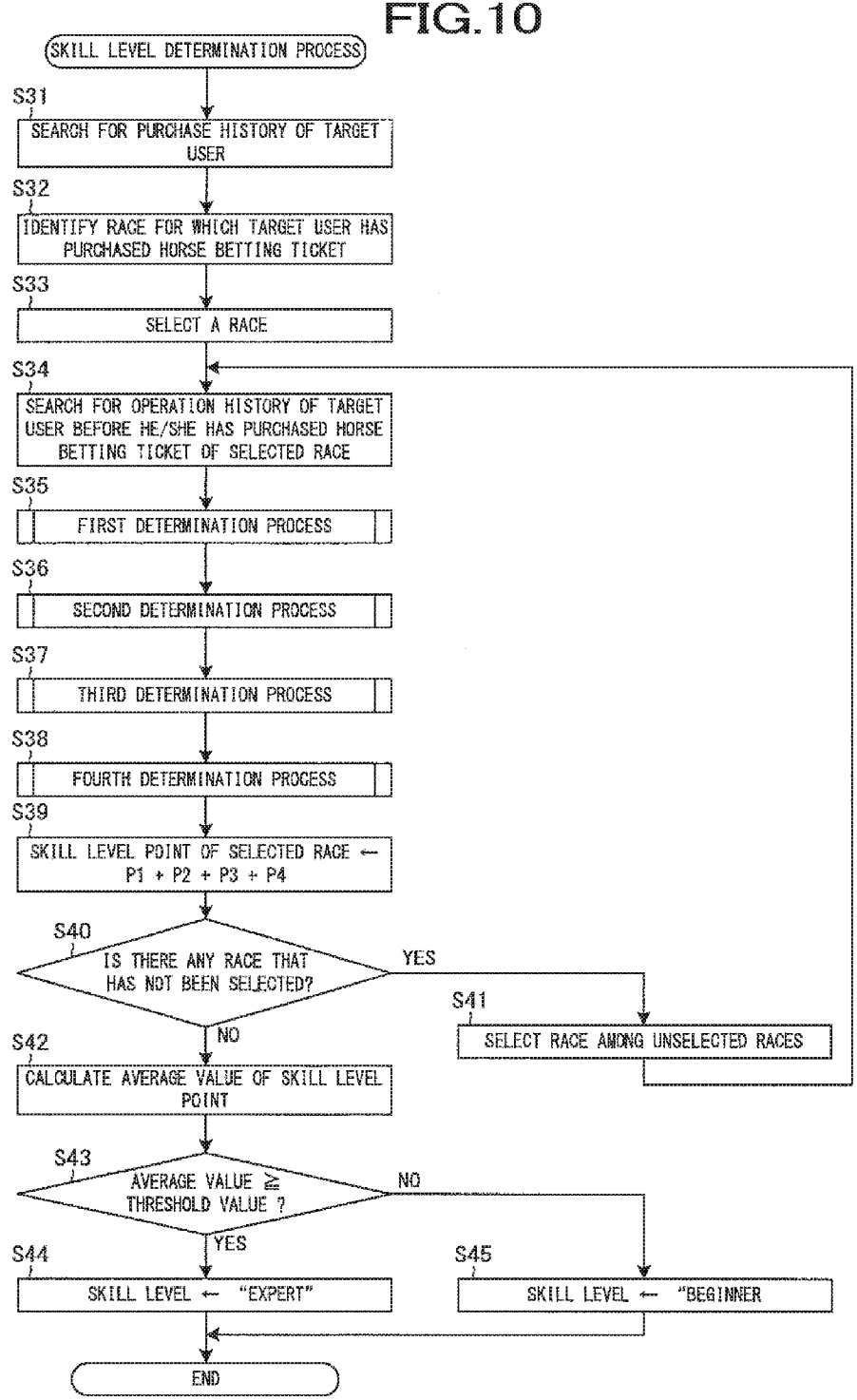
FIG. 10 is a flowchart illustrating an example of skill level determination process by the system control unit 14 of the horse betting ticket sale agency server 1 according to the embodiment.

FIG. 10 is a flowchart illustrating an example of skill level determination process by the system control unit 14 of the horse betting ticket sale agency server 1 according to the embodiment. As illustrated in FIG. 10, the history acquisition unit 141 searches the operation history DB 12*e* for the purchase history including the user ID of the target user (step S31). At this time, the history acquisition unit 141 may search the purchase history that does not include the race ID of the target race. The history acquisition unit 141 can determine what kind of operation history the operation history is by referring to the operation type included in the operation history. The history acquisition unit 141 then identifies the race for which the target user has purchased the horse betting ticket based on the searched purchase history (step S32). Specifically, the history acquisition unit 141 acquires the race ID(s) from the purchase history. The identified race (s) is an example of at least one race of the present invention. The history acquisition unit 141 may limit the race (s) to be identified. For example, the history acquisition unit 141 may determine date and time preceding to the current time by a predetermined time interval as reference date and time, and identify only the races that should be held after the reference date and time. The history acquisition unit 141 can acquire the date of the race and the post time from the race information DB as the race date and time.

The skill level determination unit 142 selects a race among the identified race(s) (step S33). The history acquisition unit 141 searches the operation history DB 12e for the operation history including the user ID of the target user and the race ID of the selected race (step S34). The skill level determination unit 142 then executes first determination process, second determination process, third determination process, and fourth determination process in order (steps S35 to S38). The first to fourth determination process correspond to the methods 1 to 4 illustrated in FIG. 6A, respectively.

Figure 11:
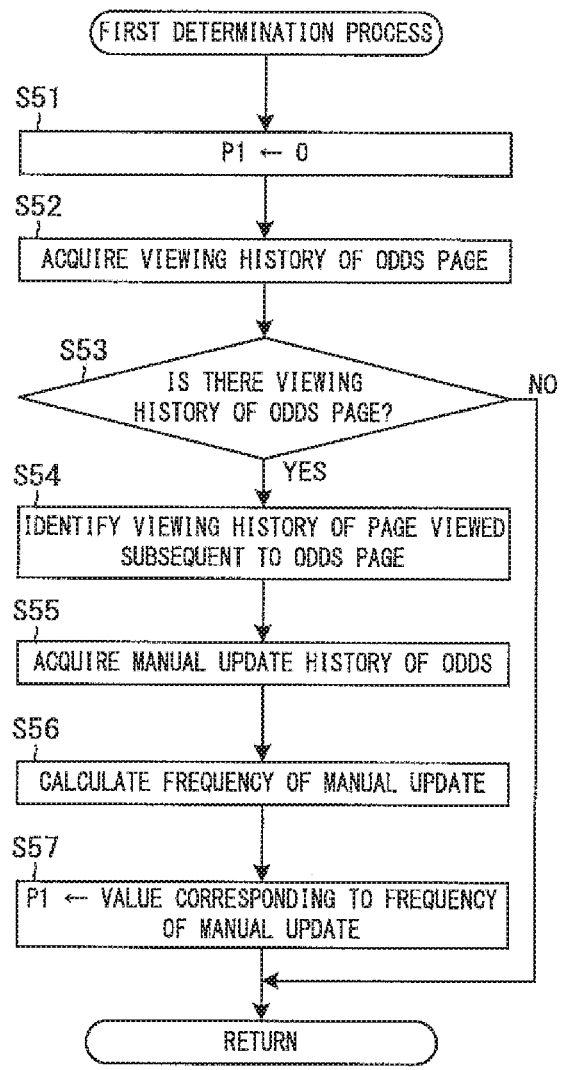
FIG. 11 is a flowchart illustrating an example of first determination process by the system control unit 14 of the horse betting ticket sale agency server 1 according to the embodiment.

FIG. 11 is a flowchart illustrating an example of the first determination process by the system control unit 14 of the horse betting ticket sale agency server 1 according to the embodiment. In the first determination process, the skill level determination unit 142 calculates a point P1 corresponding to the method 1. As illustrated in FIG. 11, the skill level determination unit 142 sets the point P1 to 0 (step S51). In the method 1, if the point P1 is larger than 0, the target user is the expert, while the target user is the beginner if the point P1 is less than 0.

The history acquisition unit 141 acquires the viewing history of the odds page from the operation history found in step S34 (step S52). The history acquisition unit 141 can determine what kind of viewing history the acquired viewing history is by referring to the page type included in the viewing history. The skill level determination unit 142 determines whether the viewing history of the odds page is included in the found operation history (step S53). At this time, if the skill level determination unit 142 determines that there is no viewing history of the odds page (step S53: NO), the first determination process is ended. Since the target user has not viewed the odds page, the skill level determination unit 142 is not able to determine whether the target user is the expert or the beginner.

On the other hand, if the skill level determination unit 142 determines that there is the viewing history of the odds page (step S53: YES), the process proceeds to step S54. In step S54, the history acquisition unit 141 identifies the viewing history of the webpage viewed by the target user subsequent to the odds page. Specifically, the history acquisition unit 141 extracts the viewing history of webpages from the operation history found in step S34. The history acquisition unit 141 then acquires the viewing time of the odds page from the viewing history of the odds page. The history acquisition unit 141 acquires the viewing time of each webpage from the individual viewing history of the extracted webpages. The history acquisition unit 141 determines the viewing time, among the acquired viewing time, later than and closest to the viewing time of the odds page. The history acquisition unit 141 identifies the viewing history including the determined viewing time as the viewing history of the webpage that the target user has viewed subsequent to the odds page.

The history acquisition unit 141 then acquires the manual update history of the odds from the operation history found in step S34. The skill level determination unit 142 calculates the frequency of the manual update (step S56). Specifically, the skill level determination unit 142 calculates the display time of the odds page by subtracting the viewing time included in the viewing history of the odds page from the viewing time included in the viewing history of the webpage viewed subsequent to the odds page. If there is more than one viewing history of the odds page, the skill level determination unit 142 calculates the display time for each viewing history to obtain the total display time. The skill level determination unit 142 calculates the frequency of the manual update by dividing the number of manual update histories by the display time. The skill level determination unit 142 sets the point P1 to a value corresponding to the frequency of the manual update (step S57). The skill level determination unit 142 increases the point P1 as the frequency of the manual update is higher. For example, the skill level determination unit 142 may calculate the point P1 using a predetermined calculation formula. Alternatively, the storage unit 12 may store a table that represents the correspondence relation between the point and the frequency of the manual update. In this case, the skill level determination unit 142 may acquire the point corresponding to the frequency of the manual update from the table. When step S57 is ended by the skill level determination unit 142, the first determination process is ended.

Figure 12:
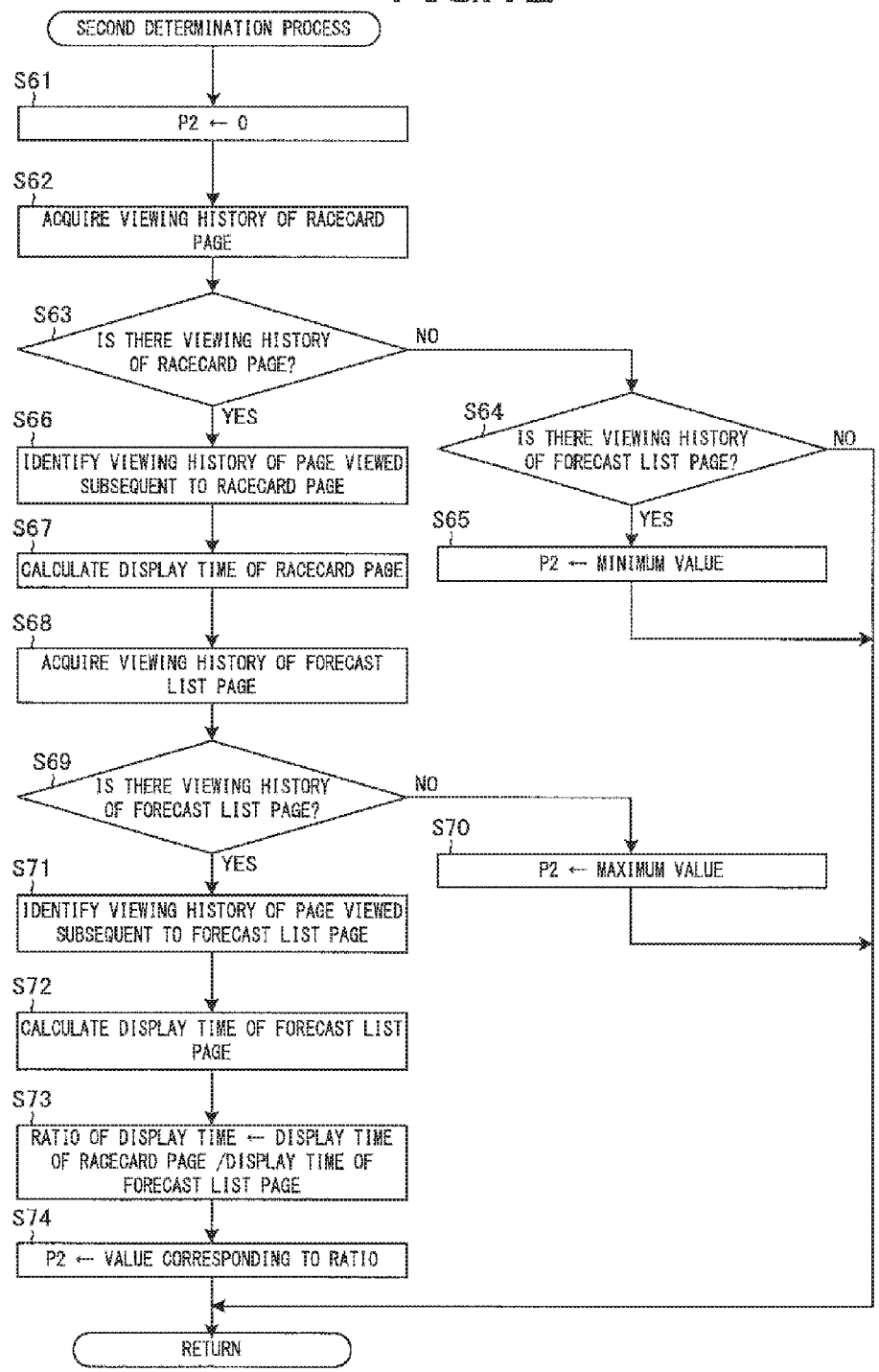
FIG. 12 is a flowchart illustrating an example of second determination process by the system control unit 14 of the horse betting ticket sale agency server 1 according to the embodiment.

FIG. 12 is a flowchart illustrating an example of the second determination process by the system control unit 14 of the horse betting ticket sale agency server 1 according to the embodiment. In the second determination process, the skill level determination unit 142 calculates a point P2 corresponding to the method 2. As illustrated in FIG. 12, the skill, level determination unit 142 sets the point P2 to 0 (step S61). In the method 2, if the point P2 is larger than 0, the target user is the expert, while the target user is the beginner if the point P2 is less than 0. The history acquisition unit 141 acquires the viewing history of the racecard page from the operation history found in step S34 (step S62).

The skill level determination unit 142 determines whether the viewing history of the racecard page is included in the found operation history (step S63). At this time, if the skill level determination unit 142 determines that there is the viewing history of the racecard page (step S63: YES), the process proceeds to step S66. On the other hand, if the skill level determination unit 142 determines that there is no viewing history of the racecard page (step S63: NO), the process proceeds to step S64.

In step S64, the skill level determination unit 142 determines whether the viewing history of the forecast list page is included in the operation history found in step S34. At this time, if the skill level determination unit 142 determines that there is the viewing history of the forecast list page (step S64: YES), the process proceeds to step S65. In step S65, the skill level determination unit 142 acquires the minimum value of the point P2 from the storage unit 12. The skill level determination unit 142 sets the point P2 to the minimum value. When the step S65 is ended by the skill level determination unit 142, the second determination process is ended.

On the other hand, if the skill level determination unit 142 determines that there is no viewing history of the forecast list page (step S64: NO), the second determination process is ended. Since the target user has not viewed the racecard page or the forecast list page, the skill level determination unit 142 is not able to determine whether the target user is the expert or the beginner.

In step S66, the history acquisition unit 141 identifies the viewing history of the webpage viewed by the target user subsequent to the racecard page. The method of identifying the viewing history of the webpage that has been viewed subsequently is the same as the method performed in step S54 of the first determination process. The skill level determination unit 142 calculates the display time of the racecard page by subtracting the viewing time included in the viewing history of the racecard page from the viewing time included in the viewing history of the webpage viewed subsequent to the racecard page (step S67). If there is more than one viewing history of the racecard page, the skill level determination unit 142 calculates the display time for each viewing history to obtain the total display time.

The history acquisition, unit 141 acquires the viewing history of the forecast list page from the operation history found in step S34 (step S68). The skill level determination unit 142 determines whether the viewing history of the forecast list page is included in the found operation history (step S69). At this time, if the skill level determination unit 142 determines that there is no viewing history of the forecast list page (step S69: NO), the process proceeds to step S70. In step S70, the skill level determination unit 142 acquires the maximum value of the point P2 from the storage unit 12. The skill level determination unit 142 sets the point P2 to the maximum value. When the step S70 is ended by the skill level determination unit 142, the second determination process is ended.

On the other hand, if the skill level determination unit 142 determines that there is the viewing history of the forecast list page (step S69: YES), the process proceeds to step S71. In step S71, the history acquisition unit 141 identifies viewing history of the webpage viewed by the target user subsequent to the forecast list page. The skill level determination unit 142 calculates the display time of the forecast list page by subtracting the viewing time included in the viewing history of the forecast list page from the viewing time included in the viewing history of the webpage viewed subsequent to the forecast list page (step S72). If there is more than one viewing history of the forecast list page, the skill level determination unit 142 calculates the display time for each viewing history to obtain the total display time.

Next, the skill level determination unit 142 calculates the ratio of display time by dividing the display time of the racecard page by the display time of the forecast list page (step S73). The skill level determination unit 142 sets the point P2 to a value corresponding to the ratio of display time (step S74). At this time, the skill level determination unit. 142 increases the point P2 as the ratio of display time is higher. For example, the skill level determination unit 142 may calculate the point P2 by a predetermined calculation formula, or may acquire the point corresponding to the ratio of display time from a table stored in the storage unit 12. When the step S74 is ended by the skill level determination unit 142, the second determination process is ended.

FIG. 13A is a flowchart illustrating an example of the third determination process by the system control unit 14 of the horse betting ticket sale agency server 1 according to the embodiment. In the third determination process, the skill level determination unit 142 calculates a point P3 corresponding to the method 3. As illustrated in FIG. 13A, the skill level determination unit 142 sets the point P3 to 0 (step S81). In the method 3, if the point P3 is larger than 0, the target user is the expert, while the target user is the beginner if the point P3 is less than 0. The history acquisition unit 141 acquires the viewing history of the racecard page from the operation history found in step S34 (step S82). The skill level determination unit 142 determines whether the viewing history of the racecard page is included in the found operation history (step S83). At this time, if the skill level determination unit 142 determines that there is no viewing history of the racecard page (step S83: NO), the third determination process is ended. Since the target user has not viewed the racecard page, the skill level determination unit 142 is not able to determine whether the target user the expert or the beginner.

On the other hand, if the skill level determination unit 142 determines that there is the viewing history of the racecard page (step S83: YES), the process proceeds to step S84. In step S84, the history acquisition unit 141 identifies the viewing history of the webpage viewed by the target user subsequent to the racecard page. The skill level determination unit 142 determines whether the odds page or the forecast list page has been viewed subsequent to the racecard page according to the page type included in the identified viewing history (step S85). At this time, when the skill level determination unit 142 determines that both the odds page and the forecast list page have not been viewed (step S85: NO), the third determination process is ended.

On the other hand, if the skill level determination unit 142 determines that the odds page or the forecast list page has been viewed (step S85: YES), the process proceeds to step S86. In step S86, the skill level determination unit 142 calculates the display time of the racecard page. The method of calculating the display time is the same as the method performed in step S67 of the second determination process. The skill level determination unit. 142 sets the point P3 to the value corresponding to the display time (step S87). The skill level determination unit 142 increases the point P3 as the display time is longer. For example, the skill level determination unit 142 may calculate the point P3 by a predetermined calculation formula, or may acquire the point corresponding to the display time from the table stored in the storage unit 12. When the step S87 is ended by the skill level determination unit 142, the third determination process is ended.

FIG. 13B is a flowchart illustrating an example of the fourth determination process by the system control unit 14 of the horse betting ticket sale agency server 1 according to the embodiment. In the fourth determination process, the skill level determination unit 142 calculates a point P4 corresponding to the method 4. As illustrated in FIG. 13B, the history acquisition unit 141 acquires the purchase history from the operation history found in step S34 (step S91). The skill level determination unit 142 determines the number of bet objects based on the found purchase history (step S92). For example, the skill level determination unit 142 may determine the number of bet objects corresponding to the type of bet included in the purchase history. The skill level determination unit 142 may acquire the horse numbers and the bracket numbers from the purchase history. The skill level determination unit 142 may determine the horse numbers and the bracket numbers as the number of bet objects. At this time, if there is, for example, a plurality of the same horse numbers or bracket numbers, the skill level determination unit 142 allocates 1 to the horse numbers or the bracket numbers as the number of bet objects.

The skill level determination unit 142 sets the point P4 to a value corresponding to the number of bet objects (step S93). At this time, the skill level determination unit 142 increases the point P4 as the number of bet objects is larger. For example, the skill level determination unit 142 may calculate the point P4 by a predetermined calculation formula, or may acquire the point corresponding to the display time from the table stored in the storage unit 12. When the step S93 is ended by the skill level determination unit 142, the fourth determination process is ended.

When the fourth determination process is ended, the skill level determination unit 142 calculates the total value of the points P1 to P4 calculated by the first to fourth determination process, as illustrated in FIG. 10 (step S39). The skill level determination unit 142 determines the total value as the expert point of the race. The skill level determination unit 142 determines whether there is a race that has not been selected yet among the identified race (s) (step S40). At this time, if the skill level determination unit 142 determines that there is a race that have not been selected (step S40: YES), the process proceeds to step S41. In step S41, the skill level determination unit 142 selects one of the race (s) that have not been selected. For the skill level determination unit 142, the process proceeds to step S34.

On the other hand, if the skill level determination unit 142 determines that all race (s) have been selected (step S40: NO), the process proceeds to step S42. In step S42, the skill level determination unit 142 calculates an average value of the expert points calculated in step S39. The skill level determination unit 142 determines whether the average value is equal to or larger than a threshold value stored in the storage unit 12 (step S43). At this time, if the skill level determination unit 142 determines that the average value is equal to or larger than the threshold value (step S43: YES), the process proceeds to step S44. In step S44, the skill level determination unit 142 sets the skill level to the "expert" level. On the other hand, if the skill level determination unit 142 does not determine that the average value is equal to or larger than the threshold value (step S43: NO), the process proceeds to step S45. In step S45, the skill level determination unit 142 sets the skill level to the "beginner" level. When the step S44 or S45 is ended by the skill level determination unit 142, the skill level determination process is ended.

As described above, the system control unit 14 acquires the operation history of the target user of the identified race from the storage unit 12. The system control unit 14 determines the skill level of the target use about the purchase of the horse betting ticket based on the operation status identified according to the operation history acquired by the system control unit 14. The system control unit 14 controls the display of the information of the target race for the target user according to the skill levels. Therefore, suitable information for each user can be provided automatically without increasing time or effort of the user.

The system control unit 14 acquires the manual update history of the identified race and calculates the frequency of the manual update. As the frequency of the manual update is higher, the system control unit 14 determines that the skill level is higher. The system control unit 14 acquires the viewing history of the racecard page and the forecast list page for the identified race to calculate the ratio of display time. As the ratio of the display time is higher, the system control unit 14 determines that the skill level is higher. The system control unit 14 acquires the viewing history of the racecard page of the identified race and acquires the viewing history of the odds page or the viewing history of the forecast list page. If the odds page or the forecast list page is displayed subsequent to the racecard page, the system control unit 14 determines that the skill level is lower as the display time of the racecard page is shorter. The system control unit 14 acquires the purchase history of the identified race to determine the number of bet objects. As the number of bet objects is larger, the system control unit 14 determines that the skill level is higher. Therefore, the skill levels can be appropriately determined.

When the odds stored in the storage unit. 12 are displayed on the screen of the user terminal 3, the system control unit 14 causes the display of the odds to be updated periodically based on the latest odds stored in the storage unit 12. As the skill level is higher, the update cycle of the display of the odds is decreased by the system control unit 14. Therefore, the odds are automatically updated at an appropriate cycle corresponding to the skill level. The update cycle of the odds is longer for the users having lower skill levels. Therefore, the processing load of updating the odds on the horse betting ticket sale agency server 1 can be reduced.

The system control unit 14 updates the display of the odds periodically based on the latest odds stored in the storage unit 12 only when the skill level is equal to or higher than the predetermined skill level. Therefore, whether the odds are automatically updated is appropriately controlled according to the skill levels. The odds are not automatically updated for the users having a lower skill level. Therefore, the processing load of updating the odds on the horse betting ticket sale agency server 1 can be reduced.

The system control unit 14 cause the user terminals 3 to display the racecard page and increases the amount of information of the horse entry information included in the racecard page as the skill level is higher. Therefore, the appropriate amount of information about the racehorses participating in the race according to the skill levels can be provided. Compared to the case in which the racecard page having a large amount of information is displayed to all users, the amount of information can be decreased. This leads to the reduction of the processing load for the horse betting ticket sale agency server 1 and the reduction of the communication load for the network.

The system control unit 14 determines the skill levels based on the operation history having been stored before the purchase of the horse betting tickets of the identified race among the operation history stored in the storage unit 12. Thus, the horse betting ticket sale agency server 1 can acquire the appropriate operation history as the operation history for purchasing the horse betting tickets.

In the embodiment described above, the horse betting ticket sale agency server 1 controls the display of the information of the races using the skill levels. However, the skill levels may not be used. For example, the horse betting ticket sale agency server 1 may control the update cycle of the automatic update of the odds according to the frequency of the manual update of the odds. Specifically, the horse betting ticket sale agency server 1 calculates the frequency of the manual update based on the manual update history, and decreases the update cycle as the frequency of the manual update is higher. The horse betting ticket sale agency server 1 may also control whether the odds are automatically updated according to the frequency of the manual update of the odds. Specifically, the horse betting ticket sale agency server 1 automatically updates the odds when the frequency of the manual update is equal to or higher than a predetermined value, and does not automatically update the odds when the frequency of the manual update is smaller than the predetermined value.

The horse betting ticket sale agency server 1 may control the racecard data such that the racecard data can be downloaded in the horse racing website. The format of the racecard data may be a PDF format for example. For example, the racecard data may be stored in the storage unit 12 of the horse betting ticket sale agency server 1. The racecard data may include, for example, a detailed version and a brief version of the racecard data. The amount of information of the detailed version of the racecard data is larger than the amount of information of the brief version of the racecard data. For example, the contents of the detailed version of the racecard data may be the same as the contents of the racecard page illustrated in FIG. 2, while the contents of the racecard data of the brief version of the racecard data may be the same as the contents of the racecard page illustrated in FIG. 7. For example, the horse betting ticket sale agency server 1 may generate the racecard data based on the race information DB 12*b*. The horse betting ticket sale agency server 1 transmits a download page in response to the request from the user terminal 3. The download page is a webpage for downloading the racecard data. For example, a link for downloading the detailed version of the racecard data and a link for downloading the brief version of the racecard data may be displayed on the download page. The horse betting ticket sale agency server 1 may control the order of placing the links on the download page according to the skill levels. Specifically, when the skill level of the target user is determined to be equal to or higher than the predetermined skill level, the horse betting ticket sale agency server 1 transmits the download page in which the link for downloading the detailed version of the racecard data is displayed above the link for downloading the brief version of the racecard data. On the other hand, when the skill level of the target user is determined to be lower than the predetermined skill level, the horse betting ticket sale agency server 1 transmits the download page in which the link for downloading the brief version of the racecard data is displayed above the link for downloading the detailed version of the racecard data.

In the embodiment described above, the present invention has been applied to races. The present invention, however, may also be applied to matters other than the races. For those matters, the present invention may be applied to the technique of determining the skill levels of users. For example, it is assumed that there is a webpage in which the instruction manual of items for sale, such as electric appliances, is displayed. The instruction manual includes a plurality of chapters. For each chapter that constitutes the instruction manual, a webpage may be provided. An information processing device records the viewing history of the webpages in a predetermined website in a database. The information processing device determines the skill level of a target user based on the viewing status of the webpage identified from the viewing history. For example, the information processing device may determine that the skill level about a particular item for sale is high when a predetermined chapter of the instruction manual is pinpointed and viewed. This is because the user does not seem to have any doubt before reaching target information. If there is a doubt, the user may reach the target information after viewing various chapters. The information processing device may, for example, calculate the number of times the instruction manual has been viewed for each chapter. The information processing device may calculate a ratio of the number of views of the predetermined chapter to the number of views of other chapters. As the calculate ratio is smaller, the information processing device may determine that the skill level is higher. The information processing device may control the display of the information in the predetermined website based on the ski 11 levels, or may use the skill levels for other purposes.

In the embodiment described above, the information processing device of the present invention has been applied to the server device of the client server system. However, the information processing device of the present invention may be applied to any information processing device other than the server device. For example, the information processing device of the present invention may be applied to, for example, the user terminals 3. In this case, the information processing device may store, for example, the operation history, or may acquire the operation history from a predetermined server device. The control unit included in the information processing device may, for example, function as a means of the present invention, such that the control unit may control the display of information by display means, such as a display. In this case, the display means may be included in the information processing device. Alternatively, the display means may be provided separately from the information processing device.

REFERENCE SIGNS LIST

1 Horse betting ticket sale agency server
2 Promoter server
3 User terminal
11 Communication unit
12 Storage unit
12*a* Member information DB
12*b* Race information DB
12*c* Horse betting ticket information DB
12*d* Odds information DB
12*e* Operation history DB
12*f* Forecast information DB
13 Input/output interface
14 System control unit
14*a* CPU
14*b* RUM
14*c* RAM
15 System bus
141 History acquisition unit
142 Skill level determination unit
143 Display control unit
NW Network
S Information processing system

The invention claimed is:

1. A computer architecture having a special purpose computer program, comprising:
   at least one memory configured to store special purpose computer program code; and
   at least one processor configured to access said at least one memory and operate as instructed by said special purpose computer program code, said special purpose computer program code including:
      acquiring code configured to cause at least one of said at least one processor to acquire, from a storage configured to store histories of operations for purchasing betting tickets of at least one race, a history of operation by a predetermined user for the at least one race;
      determination code configured to cause at least one of said at least one processor to determine a skill level of the predetermined user about purchasing of betting tickets based on an operation status identified from the acquired history; and
      control code configured to cause at least one of said at least one processor to control display of race information of the at least one race in response to a request from the predetermined user according to the determined skill level, wherein the acquired history includes an operation of updating odds of betting tickets, while odds provided by an organizer of the at least one race are displayed, to most recent odds provided by the organizer of the at least one race, and the determination code is further configured to cause at least one of said at least one processor to determine that the skill level of the predetermined user is higher as a frequency of the operation of updating the odds is higher.

2. The computer architecture according to claim 1, wherein the acquired history includes an operation of displaying information about race objects that participate in the at least one race, and an operation of displaying a forecast of race results of the at least one race, and the determination code is configured to cause at least one of said at least one processor to determine that the skill level is higher as a ratio of display time of the information about the race objects to display time of the information of the forecast is higher.

3. The computer architecture according to claim 1, wherein the acquired history includes an operation of displaying information about race objects that participate in the at least one race, and an operation of displaying information of odds of betting tickets, or an operation of displaying information of forecast of race results of the at least one race, and the determination code is further configured to cause at least one of said at least one processor to determine that the skill level is lower as display time of the information about the race objects is shorter when the information of the odds or the information of the forecast is next displayed after the information about the race objects is displayed.

4. The computer architecture according to claim 1, wherein the determination code is further configured to cause at least one of said at least one processor to:

calculate a number of bet objects based on a specified betting type that the predetermined user bets on by purchasing the betting tickets, the bet objects include the number of race objects or race brackets; and determine that the skill level increases with an increase in the number of bet objects for the specified betting type.

5. The computer architecture according to claim 1, wherein when odds of the betting tickets of the at least one race, stored in an odds storage configured to store the odds corresponding to the request from the predetermined user and being updated at predetermined timing, are displayed, the control code is further configured to cause at least one of said at least one processor to periodically update display of the odds based on the latest odds stored in the odds storage, and decrease a periodic cycle for updating the display of the odds as the determined skill level is higher.

6. The computer architecture according to claim 1, wherein when odds of the betting tickets of the at least one race, stored in an odds storage configured to store the odds corresponding to the request from the predetermined user and being updated at predetermined timing, are displayed, the control code is further configured to cause at least one of said at least one processor to periodically update display of the odds based on the latest odds stored in the odds storage only when the determined skill level is equal to or higher than a predetermined skill level.

7. The computer architecture according to claim 5, wherein the control code is further configured to cause at least one of said at least one processor to periodically update the display of the odds based on the latest odds stored in the odds storage only when the determined skill level is equal to or higher than a predetermined skill level.

8. The computer architecture according to claim 1, wherein the control code is further configured to cause at least one of said at least one processor to cause information about race objects that participate in the at least one race corresponding to the request from the predetermined user to be displayed, and increase an amount of the information about the race object as the determined skill level is higher.

9. The computer architecture according to claim 2, wherein the control code is further configured to cause at least one of said at least one processor to cause information about race objects that participate in the at least one race corresponding to the request from the predetermined user to be displayed, and increase an amount of the information about the race object as the determined skill level is higher.

10. The computer architecture according to claim 3, wherein the control code is further configured to cause at least one of said at least one processor to cause information about race objects that participate in the at least one race corresponding to the request from the predetermined user to be displayed, and increase an amount of the information about the race object as the determined skill level is higher.

11. The computer architecture according to claim 1, wherein the determination code is further configured to cause at least one of said at least one processor to determine the skill level based on a history that has been stored on or before a betting ticket is purchased among the history stored in the storage.

12. An information processing method performed by a computer, the method comprising:

acquiring, from a storage configured to store histories of operations for purchasing betting tickets of at least one race, a history of operation by a predetermined user for the at least one race;

determining a skill level of the predetermined user about purchasing of betting tickets based on an operation status identified from the acquired history; and controlling display of race information of the at least one race in response to a request from the predetermined user according to the determined skill level, wherein the acquired history includes an operation of updating odds of betting tickets, while odds provided by an organizer of the race are displayed, to most recent odds provided by the organizer of the race, and the determining of the skill level of the predetermined user includes determining that the skill level is higher as a frequency of the operation of updating the odds is higher.

13. A non-transitory computer readable medium having storing thereon a special purpose computer program, the special purpose computer program causing a computer to:
  acquire, from a storage configured to store histories of operations for purchasing a betting tickets of at least one race, a history of operation by a predetermined user for the at least one race;
  determine a skill level of the predetermined user about purchasing of betting tickets based on an operation status identified from the acquired history; and
  control display of race information of the at least one race in response to a request from the predetermined user according to the determined skill level, wherein
  the acquired history includes an operation of updating odds of betting tickets, while odds provided by an organizer of the race are displayed, to most recent odds provided by the organizer of the race, and
  the determination of the skill level of the predetermined user includes determination that the skill level is higher as a frequency of the operation of updating the odds is higher.

\* \* \* \* \*